(No Model.)
W. J. WALKER.
DEVICE FOR GRINDING LAWN MOWER KNIVES.
No. 526,824. Patented Oct. 2, 1894.
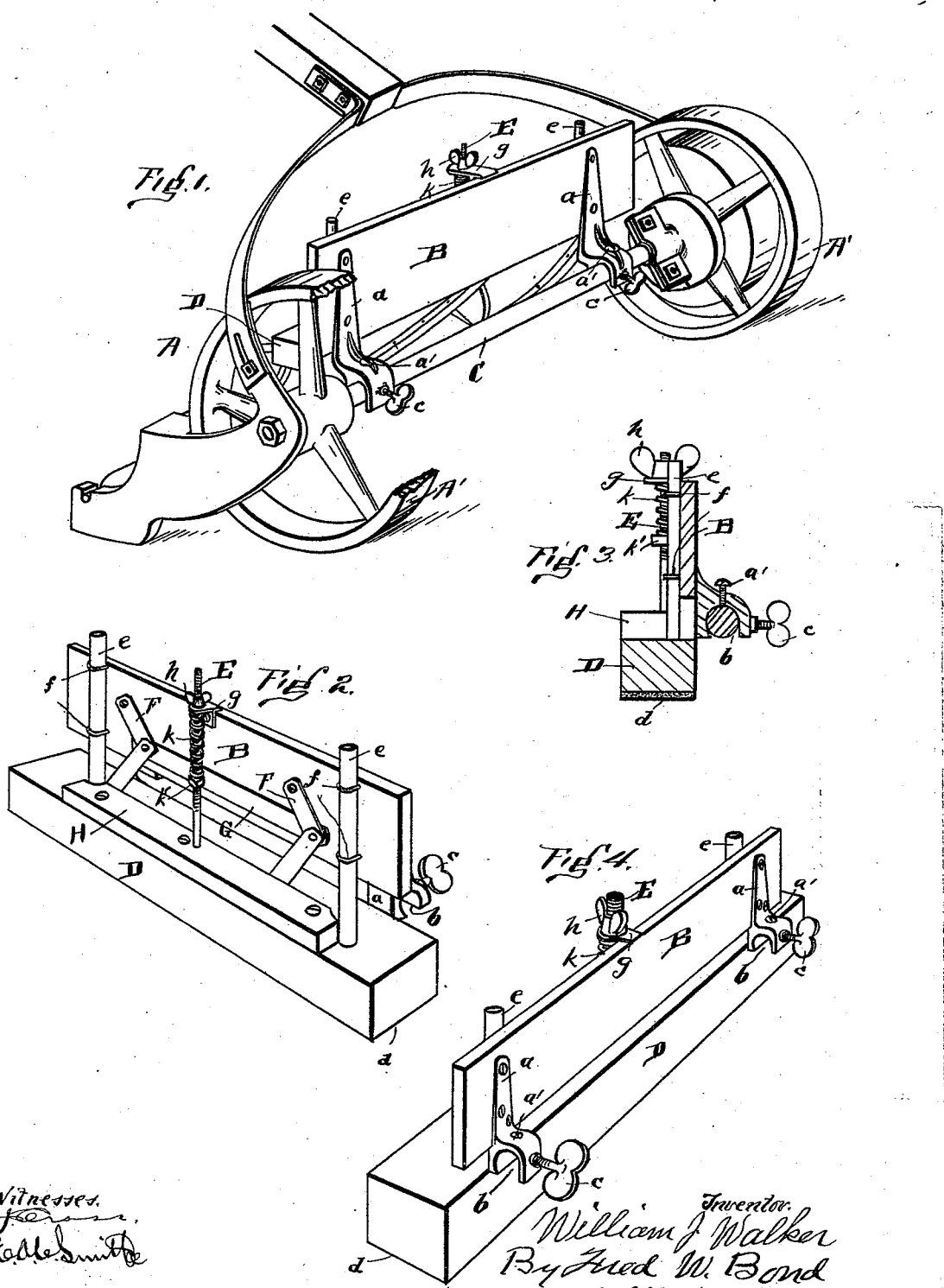

UNITED STATES PATENT OFFICE.

WILLIAM J. WALKER, OF CANTON, OHIO.

DEVICE FOR GRINDING LAWN-MOWER KNIVES.

SPECIFICATION forming part of Letters Patent No. 526,824, dated October 2, 1894.

Application filed July 14, 1894. Serial No. 517,549. (No model.)

*To all whom it may concern:*

Be it known that I, WILLIAM J. WALKER, a citizen of the United States, residing at Canton, in the county of Stark and State of Ohio, have invented certain new and useful Improvements in Devices for Grinding Lawn-Mower Knives; and I do hereby declare that the following is a full, clear, and exact description of the same, reference being had to the annexed drawings, making a part of this specification, and to the letters of reference marked thereon, in which—

Figure 1, is a view, showing my device applied to a mower and in position for use. Fig. 2, is a view of the device, showing the same detached. Fig. 3, is a vertical section, showing the same attached to a rod or bar. Fig. 4, is a view showing the opposite side of the device, from that illustrated in Fig. 2.

The present invention has relation to devices for grinding lawn mower knives, and it consists in the different parts, and combination of parts hereinafter described, and particularly pointed out in the claims.

Similar letters of reference indicate corresponding parts in all the figures of the drawings.

In the accompanying drawings A, represents a lawn mower, which may be of any desired kind or style, inasmuch as the mower proper forms no particular part of the present invention, except the proper attachment, and arrangement of the device with reference to the knives of the mower. The fixed bar B, is formed of a size to correspond with the size of the mower proper, and may be of the form shown, or it may be of any other desired form. To the bar B are attached the arms $a$, the bottom or lower ends of which are provided with the recesses $b$, said recesses being for the purpose of embracing the rod or bar C or its equivalent. The lower ends of the arms $a$ are provided with the set-screws $c$, which are for the purpose of securely holding the bar B and its different parts in secure adjustment.

The block or head D may be of any desired form, reference being had to providing a suitable grinding face, which grinding face may be provided with a strip of emery, such as $d$ or it may consist of a suitable stone properly attached to said block or head. For the purpose of holding the block or head D in proper position with reference to the bar B, the rods $e$ are provided, which rods are securely attached to the block or head D in any desired manner, and extend upward through the eyes $f$, said eyes being so formed, and adjusted that the rods $e$ can move up and down for the purpose hereinafter described.

To the block or head D is securely attached the screw threaded bar E which bar extends up through the flange $g$, which flange is securely attached to the bar B. For the purpose of adjusting the block or head D to or from the knives of the mower the thumb screw $h$, and the spring $k$ are provided, and for the purpose of giving the spring $k$ the desired amount of tension the nut $k'$ is provided and is located upon the bar E.

It will be understood that turning the thumb-screw $h$ in one direction will elevate the block or head, and turning it in the opposite direction will lower the block or head by means of the spring $k$, and at the same time securely hold said block at any desired point of adjustment.

For the purpose of causing the block or head D to move alike through its entire length, or in other words to prevent one end from moving faster than the other, the links F and the bar G, are provided, and are located and arranged substantially as illustrated in Fig. 2; one set of the links F being pivotally attached to the bar B, and the other set pivoted to the bar H or its equivalent, the bar H, being securely attached to the block or head D.

For the purpose of adjusting the block or head D, so as to bring it parallel with the knives of the mower, the arms $a$ are provided with the set-screws $a'$, the bottom or lower ends of which come in contact with the bar C. In use the bar B together with its different parts is properly adjusted to the mower proper, after which the grinding face of the block or head D is brought into proper grinding contact with the knives, by means of the thumb-screw $h$ and the spring $k$, after which the mower is passed along the ground in the usual manner until the knives are properly sharpened.

It will be understood that various forms of the arms *a* may be required to provide proper adjustment for the various makes of lawn mowers, but otherwise the arrangement of the various parts may be substantially the same for all makes of lawn mowers.

In the accompanying drawings the mower shown belongs to that class of mowers in which the wheels A' revolve upon the shaft C, but in applying my device to lawn mowers in which the shaft revolves with the wheels, the arms *a* are to be attached to a rod located to one side of the reel to which the knives are attached. This construction is not shown as it forms no part of the present invention.

The spring *k*, is located around the screw-threaded rod E, said screw-threaded rod being of such a length that the block or head can be properly adjusted to various makes of mowers, and at the same time, hold the spring so as to give said spring the desired amount of tension.

Having fully described my invention, what I claim as new, and desire to secure by Letters Patent, is—

1. The combination of a lawn mower, the fixed bar B, having attached thereto the arms *a*, provided with the recesses *b*, the block or head D, provided with a grinding face, the rods *e*, attached to the block or head D, the screw-threaded bar E, the spring *k*, the thumb-screw *h*, the nut *k'*, and the links F, and bar G, substantially as and for the purpose specified.

2. The combination of a lawn mower and a fixed bar, an adjustable block or head, provided with arms, a screw-threaded bar, having located thereon the thumb-screw *h*, the nut *k'* and the spring *k*, the links F, pivotally attached to the block or head, and to the bar B, the bar G, pivotally attached to the links F, and means for attaching the fixed bar B to a lawn mower, substantially as and for the purpose specified.

In testimony that I claim the above I have hereunto subscribed my name in the presence of two witnesses.

WILLIAM J. WALKER.

Witnesses:
F. W. BOND,
O. W. HOLL.